United States Patent
Sun et al.

(10) Patent No.: US 11,625,938 B2
(45) Date of Patent: Apr. 11, 2023

(54) METHOD AND DEVICE FOR DETECTING HUMAN SKELETONS

(71) Applicant: Industrial Technology Research Institute, Hsinchu (TW)

(72) Inventors: Wei-Cheng Sun, Kaohsiung (TW); Sänket N• Yerule, Hsinchu (TW); Chih-Chung Kao, Pingtung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 170 days.

(21) Appl. No.: 17/137,212

(22) Filed: Dec. 29, 2020

(65) Prior Publication Data

US 2022/0207265 A1  Jun. 30, 2022

(51) Int. Cl.
| | |
|---|---|
| G06V 40/10 | (2022.01) |
| G06T 9/00 | (2006.01) |
| G06T 7/246 | (2017.01) |
| H04N 19/50 | (2014.01) |

(52) U.S. Cl.
CPC ............. *G06V 40/10* (2022.01); *G06T 7/246* (2017.01); *H04N 19/50* (2014.11); *G06T 9/004* (2013.01); *G06T 2207/10016* (2013.01); *G06T 2207/30196* (2013.01)

(58) Field of Classification Search
CPC .................. G06V 40/10; G06T 7/246; G06T 2207/10016; G06T 2207/30196; G06T 9/004; H04N 19/50
See application file for complete search history.

(56) References Cited

U.S. PATENT DOCUMENTS

| | | | |
|---|---|---|---|
| 5,900,919 A | * | 5/1999 | Chen ............... H04N 19/503 348/700 |
| 6,618,439 B1 | * | 9/2003 | Kuo ............... H04N 19/537 375/E7.251 |
| 7,412,077 B2 | | 8/2008 | Li et al. |
| 10,304,208 B1 | | 5/2019 | Chandler et al. |

(Continued)

FOREIGN PATENT DOCUMENTS

| | | |
|---|---|---|
| CN | 108681700 A | 10/2018 |
| CN | 111144217 A | 5/2020 |
| CN | 111626350 A | 9/2020 |
| CN | 111641830 A | 9/2020 |
| TW | I701609 B | 8/2020 |

OTHER PUBLICATIONS

Buizza Caterina, et al., "Real-Time Multi-Person Pose Tracking using Data Assimilation", IEEE Winter Conference on Applications of Computer Vision (WACV), 2020, pp. 438-447, IEEE, US.

(Continued)

*Primary Examiner* — Kenny A Cese

(57) ABSTRACT

A method for detecting a human skeleton is provided. The method includes: receiving a video frame, wherein the video frame comprises a human body; determining whether the video frame comprises prediction information; determining whether a first intra-coded macroblock (IMB) ratio of a target area comprising the human body in the video frame is greater than a first threshold when the video frame comprises the prediction information; and using a motion vector (MV) to estimate skeleton information of the human body when the first IMB ratio of the target area is not greater than the first threshold.

16 Claims, 8 Drawing Sheets

(56) References Cited

U.S. PATENT DOCUMENTS

| | | | |
|---|---|---|---|
| 10,728,570 B2* | 7/2020 | Richert | G06T 7/215 |
| 2004/0175049 A1* | 9/2004 | Yamamoto | H04N 19/164 |
| | | | 375/E7.173 |
| 2011/0228092 A1* | 9/2011 | Park | H04N 19/157 |
| | | | 348/154 |
| 2016/0142728 A1 | 5/2016 | Wang et al. | |
| 2020/0134837 A1* | 4/2020 | Varadarajan | G06V 10/62 |

OTHER PUBLICATIONS

Landolfi Lorenzo, et al., "Fast and Fluid Human Pose Tracking", IEEE International Conference on Realtime Computing and Robotics (RCAR), 2019, pp. 24-29, IEEE, US.

Gedik, O. Serdar and Aydin Alatan. "3-D Rigid Body Tracking Using Vision and Depth Sensors", IEEE Transactions on Cybernetics, Oct. 2013, pp. 1395-1405, vol. 43, No. 5, IEEE, US.

Wu, Erwin and Hideki Koike. "Real-time Human Motion Forecasting using a RGB Camera", IEEE Conference on Virtual Reality and 3D User Interfaces (VR), 2019, pp. 1575-1577, IEEE, US.

Horiuchi, Yuuki, et al., "Computational Foresight: Forecasting Human Body Motion in Real-time for Reducing Delays in Interactive System", ISS' 17: Proceedings of the 2017 ACM International Conference on Interactive Surfacesand Spaces, Oct. 2017, pp. 312-317, ACM, US.

Huang, Ai-Mei and Truong Nguyen. "Correlation-Based Motion Vector Processing for Motion Compensated Frame Interpolation", 15th IEEE International Conference on Image Processing, 2008, 5 pages, IEEE, US.

Taiwan Patent Office, Office Action, Patent Application Serial No. 110100578, dated Dec. 30. 2021, Taiwan.

* cited by examiner

| 2nd threshold (β) | Error distance of each pixel (pixel) | | Processing speed (Frames per second, FPS) | Processing times | |
|---|---|---|---|---|---|
| | Average value | Maximum | | Openpose | Motion vector (MV) |
| -1 | 0 | 0 | 14.38 | 1322 | 0 |
| 5 | 13.68 | 263.54 | 87.82 | 130 | 1192 |
| 10 | 20.29 | 263.54 | 105.16 | 93 | 1229 |
| 15 | 25.84 | 263.54 | 118.28 | 75 | 1247 |
| 20 | 33.49 | 374.70 | 131.84 | 56 | 1266 |
| 25 | 37.87 | 374.70 | 138.33 | 48 | 1274 |
| 30 | 116.60 | 568.56 | 153.33 | 38 | 1284 |
| 40 | 179.74 | 568.56 | 189.63 | 24 | 1298 |
| 50 | 224.76 | 568.56 | 199.50 | 20 | 1302 |

FIG. 6

| 1st threshold ($\alpha$) | Error distance of each pixel (pixel) | | Processing speed (Frames per second, FPS) | Processing times | |
| --- | --- | --- | --- | --- | --- |
| | Average value | Maximum | | Openpose | Motion vector (MV) |
| -1 | 0 | 0 | 23.57 | 459 | 0 |
| 5 | 3.77 | 85.82 | 69.07 | 306 | 153 |
| 10 | 9.82 | 180.13 | 96.49 | 205 | 254 |
| 15 | 17.25 | 205.55 | 118.26 | 116 | 343 |
| 20 | 32.95 | 263.67 | 137.36 | 65 | 394 |
| 25 | 100.22 | 275.75 | 153.16 | 32 | 427 |
| 30 | 111.58 | 292.60 | 147.07 | 22 | 437 |
| 40 | 119.47 | 292.60 | 160.59 | 7 | 452 |
| 50 | 123.81 | 323.56 | 154.27 | 4 | 455 |

FIG. 7

METHOD AND DEVICE FOR DETECTING HUMAN SKELETONS

BACKGROUND

Technical Field

The present disclosure generally relates to a method and device for detecting human skeletons. More specifically, aspects of the present disclosure relate to a method and device for detecting human skeletons by using motion vectors.

Description of the Related Art

With the increasing popularity of commercial-standard edge computing devices and the introduction of 5G networks, the application of intelligent image analysis using deep learning technology has gradually been implemented in daily life. Human behavior recognition is the basic technology for many applications such as smart entertainment, smart monitoring, and human-computer interaction. Behavior-recognition can be a challenging task due to the influence of many factors, such as different lighting conditions, diversity of viewing angles, complex backgrounds, and large change of intra-class.

The research on behavior recognition can be traced back to 1973. At that time, Johansson discovered through experimental observation that the movement of the human body can be described by the movement of some major joint points. Therefore, the combination and tracking of 10 to 12 key nodes can describe many behaviors such as dancing, walking, running and other actions. Therefore, behavior can be recognized through the movement of the key nodes of the human body.

Compared with RGB-based images, skeleton information has the advantages of having clear and simple features and being less susceptible to appearance factors in skeleton-based action recognition. Skeleton-based action recognition first needs a pose estimation to be performed. Openpose and AlphaPose are types of open source software that extracts skeletons from pictures or image sequences. The problem with such open source software is that it performs a large amount of calculation and has low calculation efficiency.

Therefore, there is a need for a method and device for detecting a human skeleton to solve these problems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and device for detecting a human skeleton to overcome the above disadvantages.

In an exemplary embodiment, a method for detecting a human skeleton, comprising: receiving a video frame, wherein the video frame comprises a human body; determining whether the video frame comprises prediction information; determining whether a first intra-coded macroblock (IMB) ratio of a target area comprising the human body in the video frame is greater than a first threshold when the video frame comprises the prediction information; and using a motion vector (MV) to estimate skeleton information of the human body when the first IMB ratio of the target area is not greater than the first threshold.

In an exemplary embodiment, a device for detecting a human skeleton, comprising: one or more processors; and one or more computer storage media for storing one or more computer-readable instructions, wherein the processor is configured to drive the computer storage media to execute the following tasks: receiving a video frame, wherein the video frame comprises a human body; determining whether the video frame comprises prediction information; determining whether a first intra-coded macroblock (WB) ratio of a target area comprising the human body in the video frame is greater than a first threshold when the video frame comprises the prediction information; and using a motion vector (MV) to estimate skeleton information of the human body when the first IMB ratio of the target area is not greater than the first threshold.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

FIG. 6 is an experimental data table illustrating the second threshold and the video operation efficiency according to an embodiment of the present disclosure.

FIG. 7 is an experimental data table illustrating the first threshold and the video operation efficiency according to an embodiment of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
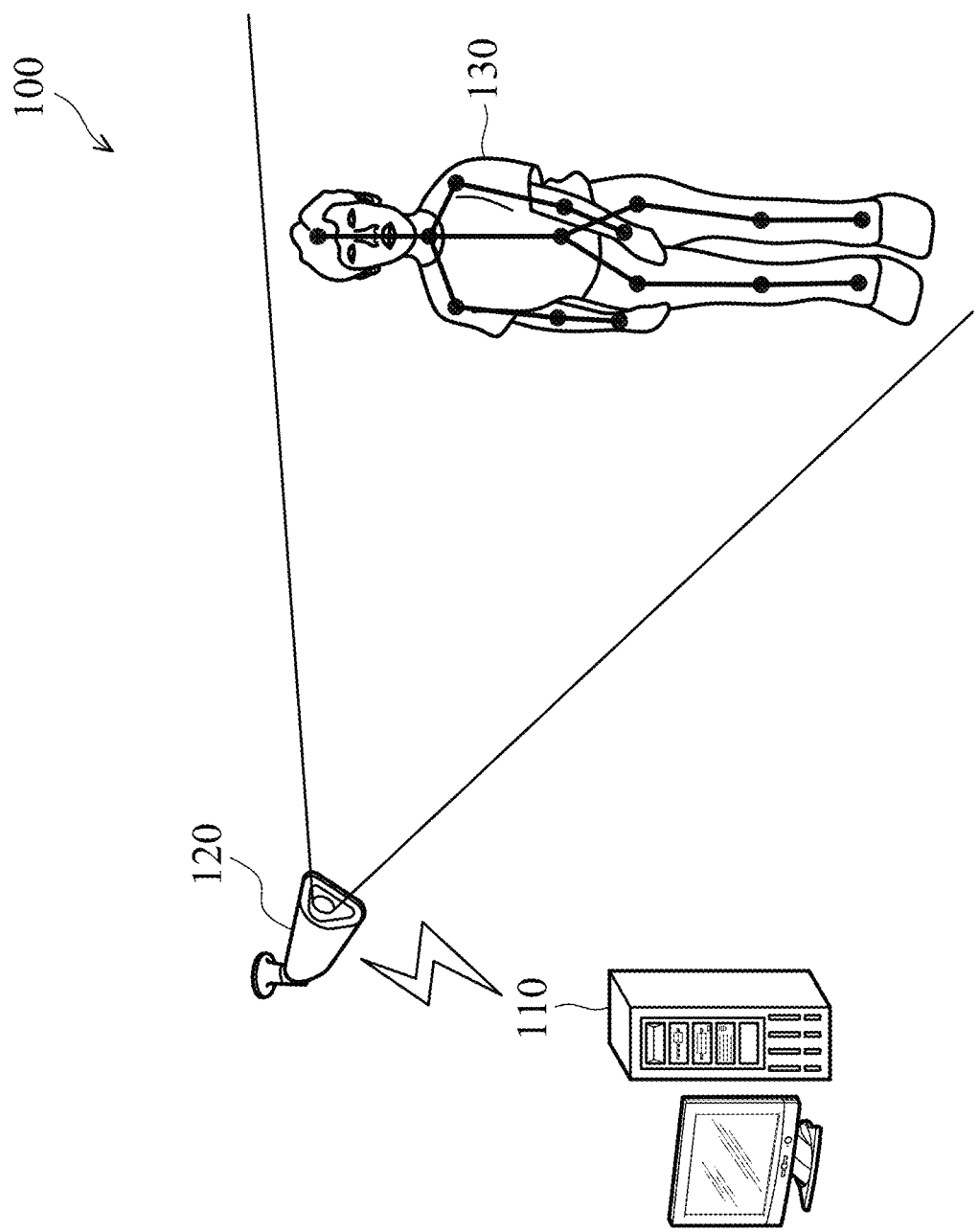
FIG. 1 is a schematic diagram illustrating an environment of the system for detecting a human skeleton according to one embodiment of the present disclosure.

FIG. 1 is a schematic diagram illustrating an environment of the system 100 for detecting a human skeleton according to one embodiment of the present disclosure. The system 100 for detecting a human skeleton comprises an electronic device 110 and a camera 120. The electronic device 100 may physically set up one or a plurality of cameras 120 to photograph the user 130.

The electronic device 110 may receive video frames from various sources. For example, the electronic device 110 may receive a video frame transmitted by the camera 120 or download a video frame from the cloud.

The types of electronic device 110 range from small handheld devices, such as mobile telephones and handheld computers to large mainframe systems, such as mainframe computers. Examples of handheld computers include personal digital assistants (PDAs) and notebooks. The electronic device 110 could be connected to the camera 120 by using the network. The network could include, but is not limited to, one or more local area networks (LANs), and/or wide area networks (WANs).

It should be understood that the electronic device 110 shown in FIG. 1 is an example of one suitable system 100 for detecting a human skeleton architecture. Each of the components in the system 100 for detecting a human skeleton shown in FIG. 1 may be implemented via any type of computing device, such as the computing device 800 described with reference to FIG. 8, for example.

Figure 2:
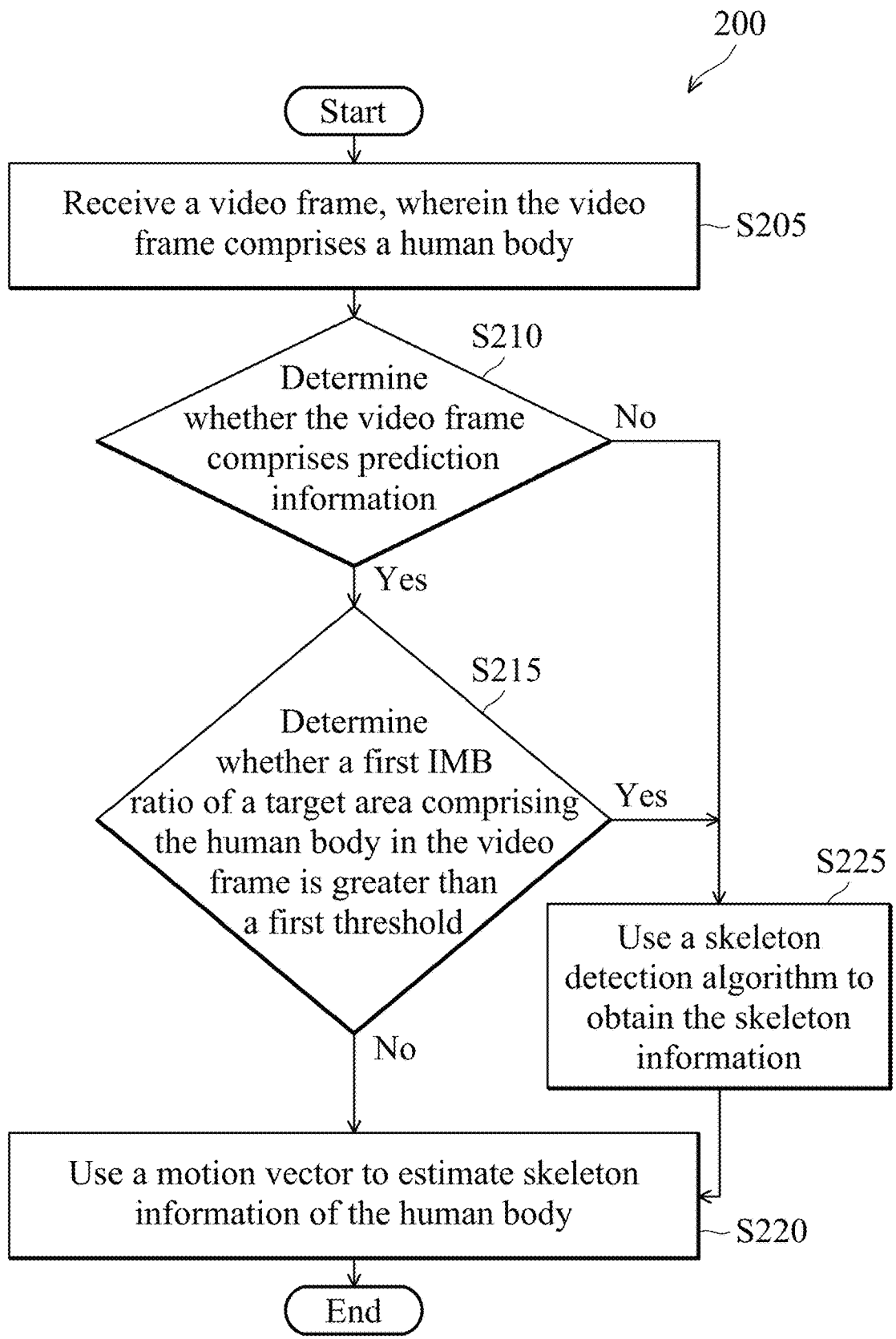
FIG. 2 is a flowchart illustrating a method for detecting a human skeleton according to an embodiment of the present disclosure.

FIG. 2 is a flowchart illustrating a method 200 for detecting a human skeleton according to an embodiment of the present disclosure. The method may be implemented in the electronic device 110 of the system 100 for detecting a human skeleton as shown in FIG. 1.

In step S205, the electronic device receives a video frame, wherein the video frame comprises a human body. Then, in step S210, the electronic device determines whether the video frame comprises prediction information. In one embodiment, when the video frame is a prediction frame (P-frame), the electronic device determines that the video frame comprises prediction information.

Furthermore, when the video frame comprises prediction information ("Yes" in step S210), in step S215, the electronic device determines whether a first intra-coded macroblock (IMB) ratio of a target area comprising the human body in the video frame is greater than a first threshold.

When the first IMB ratio of the target area is not greater than the first threshold ("No" in step S215), in step S220, the electronic device uses a motion vector (MV) to estimate skeleton information of the human body, wherein the motion vector is generated during the motion estimation process.

Return to step S210, when the video frame does not comprise prediction information ("No" in step S210), in step S225, the electronic device uses a skeleton detection algorithm to obtain the skeleton information, wherein the skeleton detection algorithm is OpenPose, AlphaPose and other algorithms. In one embodiment, when the video frame is an intra frame (I-frame), the electronic device determines that the video frame does not comprise prediction information. In other words, when the video frame is an intra frame, this means that the video frame does not have motion vector (MV) information.

When the first IMB ratio of the target area is greater than the first threshold ("Yes" in step S215), in step S225, the electronic device uses a skeleton detection algorithm to obtain the skeleton information, wherein the skeleton detection algorithm is OpenPose, AlphaPose and other algorithms.

Figure 3:
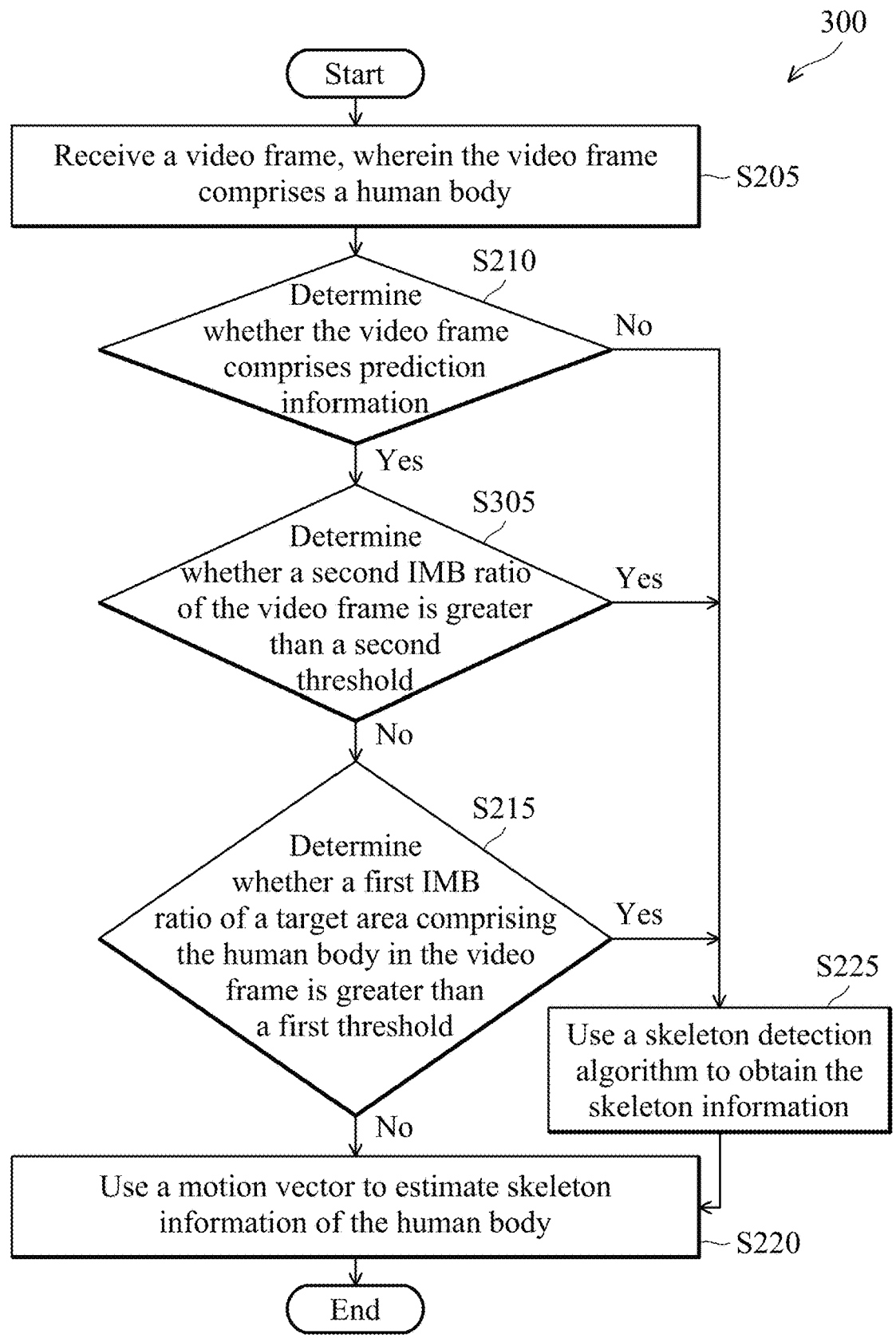
FIG. 3 is a flowchart illustrating a method for detecting a human skeleton according to an embodiment of the present disclosure.

FIG. 3 is a flowchart illustrating a method 300 for detecting a human skeleton according to an embodiment of the present disclosure. The method may be implemented in the electronic device 110 of the system 100 for detecting a human skeleton as shown in FIG. 1.

The difference from FIG. 2 is that when the electronic device determines that the video frame comprises prediction information ("Yes" in step S210), the electronic device may further determine whether a second IMB ratio of the video frame is greater than a second threshold in step S305.

When the second IMB of the video frame is not greater than the second threshold ("No" in step S305), in step S215, the electronic device determines whether the first IMB ratio of the target area is greater than the first threshold.

When the second IMB ratio of the video frame is greater than the second threshold ("Yes" in step S305), in step S225, the electronic device uses a skeleton detection algorithm to obtain the skeleton information, wherein the skeleton detection algorithm is OpenPose, AlphaPose and other algorithms.

It should be noted that the steps having the same name as described in FIG. 2 have the same step, so details related to the steps will be omitted.

The following will explain in detail how the electronic device determines whether the first IMB ratio of a target area comprising the human body in the video frame is greater than the first threshold in step S215 of FIG. 2 and how the electronic device determines whether the second IMB ratio of the video frame is greater than the second threshold in step S305 of FIG. 3.

Figure 4:
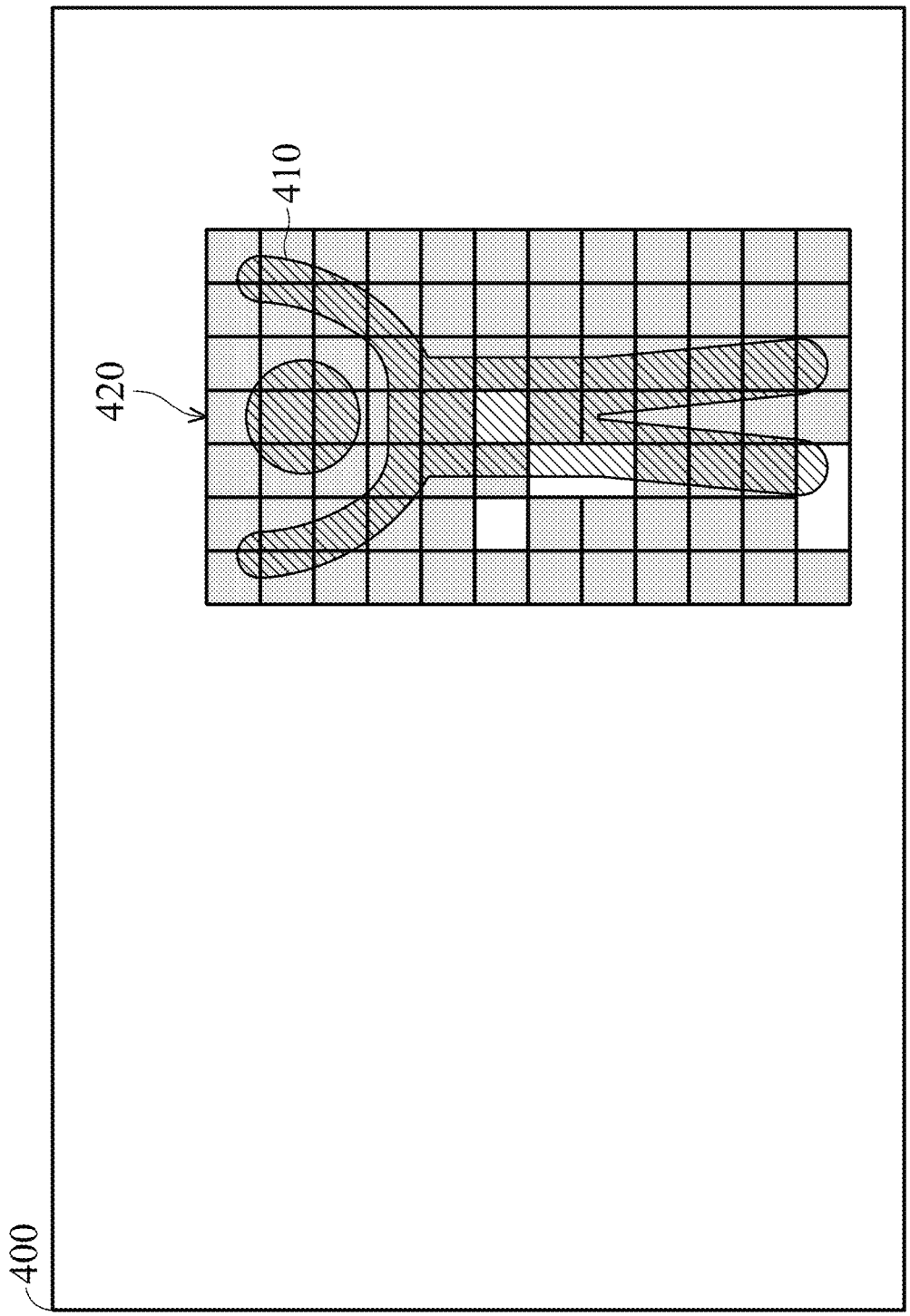
FIG. 4 is a schematic diagram illustrating the target area of the human body in the video frame according to an embodiment of the present disclosure.

FIG. 4 is a schematic diagram illustrating the target area of the human body in the video frame according to an embodiment of the present disclosure. The electronic device may obtain the target area 420 comprising a human body 410 in the video frame 400, and calculate the number of pixels comprised in the target area 420 pixelNumByFrame and the number of pixels of the first prediction macroblock (PMB) PMB_area. The first PMB ratio $PMBP_{BBox}$ can be expressed by the following formula:

$$PMBP_{BBox}=PMB\_area/pixelNumByBBox \times 100\%.$$

The first IMB ratio $IMBP_{BBox}$ can be expressed by the following formula:

$$IMBP_{BBox}=100\%-PMBP_{BBox}.$$

As shown in the FIG. 4, the gray area is the first PMB, and the remaining blocks other than the gray area are the first IMB. It is assumed that the target area 420 is composed of 84 (7×12) squares, and the length and width of each square are 16 pixels, respectively. The number of pixels PMB_area comprised in the gray area is 78×16×16. The number of pixels pixelNumByBBox comprised in the target area 420 is 84×16×16. Therefore, $PMBP_{BBox}=(78\times16\times16)/(84\times16\times16)\times100\%$ (about 92.86%), and the first IMB ratio $IMBP_{BBox}$ is about 7.14%.

Figure 5:
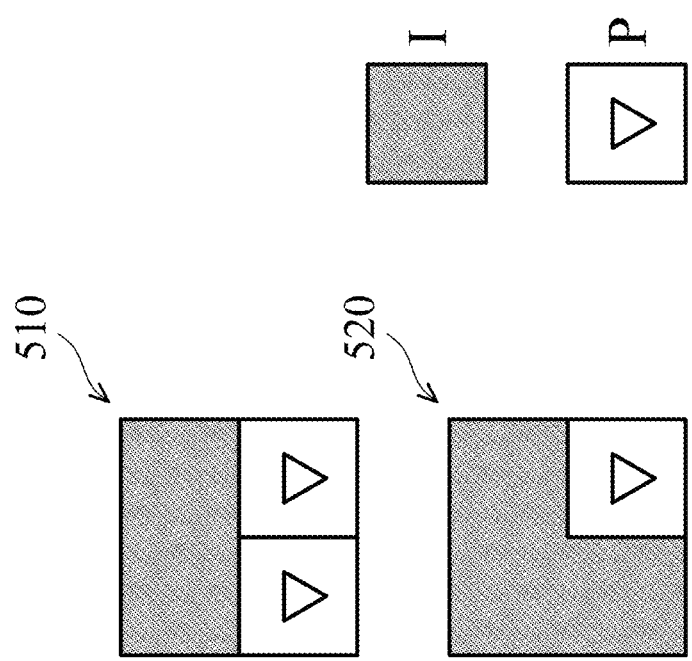
FIG. 5 is a schematic diagram illustrating a video frame comprising a second PMB and a second IMB according to an embodiment of the present disclosure.

FIG. 5 is a schematic diagram illustrating a video frame comprising a second PMB and a second IMB according to an embodiment of the present disclosure. It is assumed that there are four macroblocks in a video frame, and the size of each macroblock is 16×16 pixels.

The electronic device may calculate the number of pixels of second PMB in the video frame PMB_area, and the number of pixels comprised in the video frame pixelNumByFrame. The second PMB ratio $PMBP_{Frame}$ can be expressed by the following formula:

$$PMBP_{Frame}=PMB\_area/pixelNumByFrame \times 100\%.$$

The second IMB ratio $IMBP_{Frame}$ can be expressed by the following formula:

$$IMBP_{Frame}=100\%-PMBP_{Frame}.$$

As shown in FIG. 5, in the video frame 510, the number of pixels of the second PMB PMB_area is 512 (16×16×2), and the number of pixels comprised in the video frame 510 pixelNumByFrame is 1024 (16×16×4). Therefore, $PMBP_{Frame}=512/1024\times100\%$ (50%), and the second WM ratio $IMBP_{Frame}$ is 100%−50%=50%.

In another example, in the video frame 520, the number of pixels of the second PMB PMB_area is 256 (16×16×1), and the number of pixels comprised in the video frame 520 pixelNumByFrame is 1024 (16×16×4). Therefore, $PMBP_{Frame}=256/1024\times100\%$ (25%), and the second IMB ratio $IMBP_{Frame}$ is 100%−25%=75%.

FIG. 6 is an experimental data table 600 illustrating the second threshold and the video operation efficiency according to an embodiment of the present disclosure. Table 600 indicates that the electronic device uses different second thresholds to process the error distance and processing speed of the same video. As shown in Table 600, when the second threshold β is −1, this means that the electronic device merely uses the skeleton detection algorithm (Openpose) to obtain the skeleton information in the video. Table 600 clearly shows that when the second threshold β is 15, the electronic device may increase the processing speed by about 8 times (118.28/14.38=8.2) within an acceptable detection error. In other words, the amount of calculation for obtaining the skeleton information can be effectively reduced by the electronic device using the motion vector to detect the skeleton information when the second threshold β is 15.

FIG. 7 is an experimental data table 700 illustrating the first threshold and the video operation efficiency according to an embodiment of the present disclosure. Table 700 indicates that the electronic device uses different first thresholds to process the error distance and processing speed of the same video. As shown in Table 700, when the first threshold α is −1, this means that the electronic device merely uses the skeleton detection algorithm (Openpose) to obtain the skeleton information in the video. Table 700 clearly shows that when the first threshold α is 20, the electronic device may increase the processing speed by about 6 times (137.36/23.57=5.8) within an acceptable detection error. In other words, the amount of calculation for obtaining the skeleton information can be effectively reduced by the electronic device using the motion vector to detect the skeleton information when the second threshold α is 20.

It should be noted that the optimal values of the second threshold β and the first threshold α may change with different videos. The second threshold β and the first threshold α are not used to limit the present disclosure and those skilled in the art can make appropriate replacements or adjustments according to this embodiment.

As shown in Tables 600 and 700, when the second IMB ratio in the video frame is greater than the second threshold β, this means that the video frame comprises a small number of motion vectors, so there is a large change between the video frames. This change may be a change of light and shadow in the video or the screen zooming when the video is recorded. In such cases, the electronic device may use the skeleton detection algorithm to correct the coordinate positions of the human skeleton nodes in real time. When the second IMB ratio of the video frame is not greater than the second threshold β, the electronic device may determine whether to use the motion vector to estimate the skeleton information of the human body according to the first IMB ratio in the target area comprising the human body in the video frame.

When the first IMB ratio of the video frame is greater than the first threshold α, this means that there is a small number of motion vectors comprised in the target area of the human body (i.e., there are big changes in body movements of the human body). Therefore, the electronic device may use the skeleton detection algorithm to obtain the skeleton information to avoid problems with the skeleton nodes not being able to be updated correctly due to there being an insufficient number of motion vectors near the skeleton nodes.

When the second IMB ratio of the video frame is not greater than the second threshold β and the first IMB ratio of the target area comprising the human body in the video frame is not greater than the first threshold α, the electronic device may estimate the positions of the skeleton nodes through the group of motion vector around the skeleton nodes of the human body, so as to reduce the frequency of using the skeleton detection algorithm, improve the calculation efficiency and reduce the calculation cost.

As mentioned above, the method and device for detecting a human skeleton disclosed in the present disclosure use motion vectors to assist in detecting the human skeleton. This method and device may reduce the frequency of using a skeleton detection algorithm, improve computing efficiency, increase the number of processed image streams, and reduce computing costs.

Figure 8:
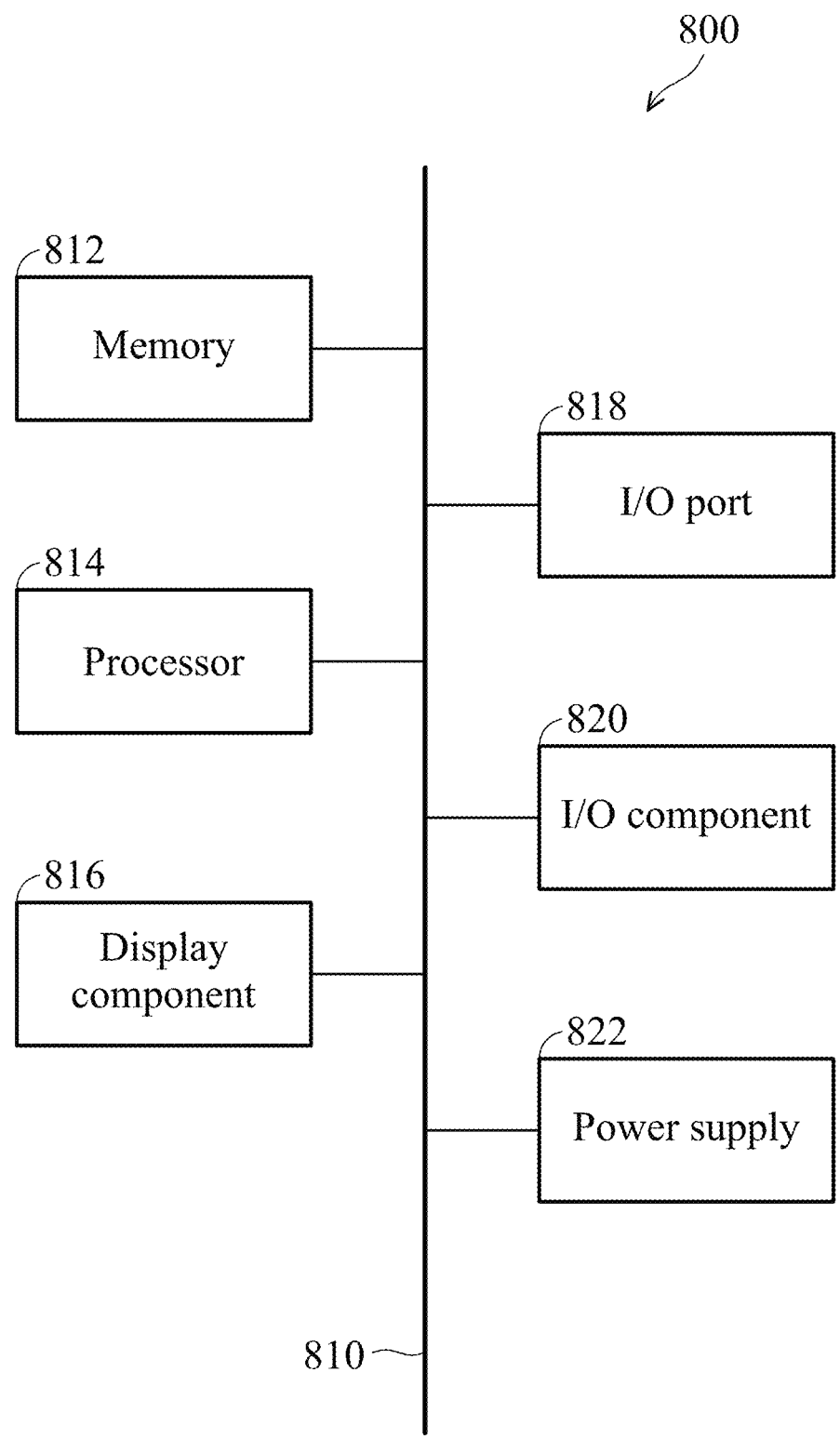
FIG. 8 illustrates an exemplary operating environment for implementing embodiments of the present disclosure.

Having described embodiments of the present disclosure, an exemplary operating environment in which embodiments of the present disclosure may be implemented is described below. Referring to FIG. 8, an exemplary operating environment for implementing embodiments of the present disclosure is shown and generally known as a computing device 800. The computing device 800 is merely an example of a suitable computing environment and is not intended to limit the scope of use or functionality of the disclosure.

Neither should the computing device 800 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 8, the computing device 800 may include a bus 810 that is directly or indirectly coupled to the following devices: one or more memories 812, one or more processors 814, one or more display components 816, one or more input/output (I/O) ports 818, one or more input/output components 820, and a power supply 822. The bus 810 may represent one or more kinds of busses (such as an address bus, data bus, or any combination thereof). Although the various blocks of FIG. 8 are shown with lines for the sake of clarity, and in reality, the boundaries of the various components are not specific. For example, the display component such as a display device may be considered an I/O component and the processor may include a memory.

The computing device 800 typically includes a variety of computer-readable media. The computer-readable media can be any available media that can be accessed by computing device 800 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 800. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 812 may include computer-storage media in the form of volatile and/or nonvolatile memory. The memory may be removable, non-removable, or a combination thereof. Exemplary hardware devices include solid-state memory, hard drives, optical-disc drives, etc. The computing device 800 includes one or more processors that read data from various entities such as the memory 812 or the I/O components 820. The display component(s) 816 present data indications to a user or to another device. Exemplary presentation components include a display device, speaker, printing component, vibrating component, etc.

The I/O ports 818 allow the computing device 800 to be logically coupled to other devices including the I/O components 820, some of which may be embedded. Illustrative components include a microphone, joystick, game pad, satellite dish, scanner, printer, wireless device, etc. The I/O components 820 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 800, or any combination thereof. The computing device 800 may be equipped with depth cameras, such as stereoscopic camera systems, infrared camera systems, RGB camera systems, or any combination thereof, to realize gesture detection and recognition. Furthermore, the computing device 800 may be equipped with accelerometers or gyroscopes that enable detection of motion. The output of the accelerometers or gyroscopes may be provided to the display of the computing device 800 to carry out immersive augmented reality or virtual reality.

Furthermore, the processor 814 in the computing device 800 can execute the program code in the memory 812 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting a human skeleton, comprising:
   receiving a video frame, wherein the video frame comprises a human body;
   determining whether the video frame comprises prediction information;
   determining whether a first intra-coded macroblock (IMB) ratio of a target area comprising the human body in the video frame is greater than a first threshold when the video frame comprises the prediction information; and
   using a motion vector (MV) to estimate skeleton information of the human body when the first IMB ratio of the target area is not greater than the first threshold, and using a skeleton detection algorithm to obtain the skeleton information when the first IMB ratio of the target area is greater than the first threshold.

2. The method for detecting a human skeleton as claimed in claim 1, wherein when the video frame is a prediction frame (P-frame), it is determined that the video frame comprises the prediction information.

3. The method for detecting a human skeleton as claimed in claim 1, wherein when the video frame comprises the prediction information, the method further comprises:
   determining whether a second IMB ratio of the video frame is greater than a second threshold; and
   determining whether the first IMB ratio of the target area is greater than the first threshold when the second IMB ratio of the video frame is not greater than the second threshold, and using the skeleton detection algorithm to obtain the skeleton information when the second IMB ratio of the video frame is greater than the second threshold.

4. The method for detecting a human skeleton as claimed in claim 3, wherein the second IMB ratio $IMBP_{Frame}$ is expressed by the following formula:

$$IMBP_{Frame}=100\%-PMBP_{Frame},$$

wherein $PMBP_{Frame}$ is a second prediction macroblock (PMB) ratio, and the second PMB ratio is expressed by the following formula:

$$PMBP_{Frame}=PMB\_area/pixelNumByFrame \times 100\%$$

wherein PMB_area is a number of pixels of the second PMB, and pixelNumByFrame is a number of pixels comprised in the video frame.

5. The method for detecting a human skeleton as claimed in claim 1, wherein the first IMB ratio $IMBP_{BBox}$ is expressed by the following formula:

$$IMBP_{BBox}=100\%-PMBP_{BBox},$$

wherein $PMBP_{BBox}$ is a first prediction macroblock (PMB) ratio, and the first PMB ratio is expressed by the following formula:

$$PMBP_{BBox}=PMB\_area/pixelNumByBBox \times 100\%$$

wherein PMB_area is a number of pixels of the first PMB in the target area, and pixelNumByFrame is a number of pixels comprised in the target area.

6. The method for detecting a human skeleton as claimed in claim 1, further comprising:
   using a skeleton detection algorithm to obtain the skeleton information when the video frame does not comprise the prediction information.

7. The method for detecting a human skeleton as claimed in claim 6, wherein the skeleton detection algorithm is OpenPose or AlphaPose.

8. The method for detecting a human skeleton as claimed in claim 1, wherein the motion vector is generated during a motion estimation process.

9. A device for detecting a human skeleton, comprising:
   one or more processors; and
   one or more computer storage media for storing one or more computer-readable instructions, wherein the processor is configured to drive the computer storage media to execute the following tasks:
   receiving a video frame, wherein the video frame comprises a human body;
   determining whether the video frame comprises prediction information;
   determining whether a first intra-coded macroblock (IMB) ratio of a target area comprising the human body in the video frame is greater than a first threshold when the video frame comprises the prediction information; and
   using a motion vector (MV) to estimate skeleton information of the human body when the first IMB ratio of the target area is not greater than the first threshold, and using a skeleton detection algorithm to obtain the skeleton information when the first IMB ratio of the target area is greater than the first threshold.

10. The device for detecting a human skeleton as claimed in claim 9, wherein when the video frame is a prediction frame (P-frame), the processor determines that the video frame comprises the prediction information.

11. The device for detecting a human skeleton as claimed in claim 9, wherein when the video frame comprises the prediction information, the processor further executes the following tasks:
   determining whether a second IMB ratio of the video frame is greater than a second threshold; and
   determining whether the first IMB ratio of the target area is greater than the first threshold when the second IMB ratio of the video frame is not greater than the second threshold, and using the skeleton detection algorithm to obtain the skeleton information when the second IMB ratio of the video frame is greater than the second threshold.

12. The device for detecting a human skeleton as claimed in claim 11, wherein the second IMB ratio $IMBP_{Frame}$ is expressed by the following formula:

$$IMBP_{Frame}=100\%-PMBP_{Frame},$$

wherein $PMBP_{Frame}$ is a second prediction macroblock (PMB) ratio, and the second PMB ratio is expressed by the following formula:

$$PMBP_{Frame}=PMB\_area/pixelNumByFrame \times 100\%,$$

wherein PMB_area is a number of pixels of the second PMB, and pixelNumByFrame is a number of pixels comprised in the video frame.

13. The device for detecting a human skeleton as claimed in claim 9, wherein the first IMB ratio $IMBP_{BBox}$ is expressed by the following formula:

$$IMBP_{BBox}=100\%-PMBP_{BBox},$$

wherein $PMBP_{BBox}$ is the first prediction macroblock (PMB) ratio, and the first PMB ratio is expressed by the following formula:

$$PMBP_{BBox}=PMB\_area/pixelNumByBBox \times 100\%,$$

wherein PMB_area is a number of pixels of the first PMB in the target area, and pixelNumByFrame is a number of pixels comprised in the target area.

14. The device for detecting a human skeleton as claimed in claim 9, the processor further executes the following task:
   using a skeleton detection algorithm to obtain the skeleton information when the video frame does not comprise the prediction information.

15. The device for detecting a human skeleton as claimed in claim 14, wherein the skeleton detection algorithm is OpenPose or AlphaPose.

16. The device for detecting a human skeleton as claimed in claim 9, wherein the motion vector is generated during a motion estimation process.

* * * * *

UNITED STATES PATENT AND TRADEMARK OFFICE
CERTIFICATE OF CORRECTION

| | |
|---|---|
| PATENT NO. | : 11,625,938 B2 |
| APPLICATION NO. | : 17/137212 |
| DATED | : April 11, 2023 |
| INVENTOR(S) | : Wei-Cheng Sun, Sanket N· Yerule and Chih-Chung Kao |

It is certified that error appears in the above-identified patent and that said Letters Patent is hereby corrected as shown below:

On the Title Page

Item (72), Inventor should read:
Wei-Cheng Sun, Kaohsiung (TW);
Sanket N· Yerule, Hsinchu (TW);
Chih-Chung Kao, Pingtung County (TW)

Signed and Sealed this
Eighteenth Day of July, 2023

Katherine Kelly Vidal
*Director of the United States Patent and Trademark Office*